United States Patent
Miyamoto et al.

(10) Patent No.: US 6,215,311 B1
(45) Date of Patent: Apr. 10, 2001

(54) BATTERY CELL INSPECTING METHOD AND APPARATUS

(75) Inventors: Noboru Miyamoto, Ibaraki; Kiyotaka Hoshino, Tochigi, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/211,004

(22) Filed: Dec. 15, 1998

(30) Foreign Application Priority Data

Dec. 15, 1997 (JP) .................................................. 9-345473

(51) Int. Cl.[7] .................. G01N 27/42; G01N 27/416; H02J 7/16
(52) U.S. Cl. .......................... 324/425; 324/432; 320/166
(58) Field of Search .................................. 324/432, 435, 324/425, 426; 361/234; 320/166, 167, 124

(56) References Cited

U.S. PATENT DOCUMENTS

| | | | |
|---|---|---|---|
| 3,720,869 | * | 3/1973 | Rowlette ............................ 324/432 |
| 3,897,997 | * | 8/1975 | Kalt ...................................... 361/234 |
| 4,045,721 | * | 8/1977 | Swain ................................. 324/432 |
| 4,084,134 | * | 4/1978 | Nagano ............................ 324/72.5 |
| 5,491,417 | * | 2/1996 | Miyata et al. .................... 324/402 |
| 5,789,100 | * | 8/1998 | Burroughs et al. .............. 324/435 |

* cited by examiner

Primary Examiner—Safet Metjahic
Assistant Examiner—Jermele M. Hollington
(74) Attorney, Agent, or Firm—Sonnenschein, Nath & Rosenthal

(57) ABSTRACT

A battery cell inspection method in which the difference in the measured value in case of normal battery cell insertion and that incase of mistaken battery cell insertion is large to facilitate decision as to whether or not mistaken insertion occurred to enable stable result of decision to be achieved, and in which, if the area of the electrode plate and/or the number of the electrode plates making up a sole battery cell is small, decision as to mistaken insertion can be given easily to assure correct results of decision. To this end, measurement is made of the difference between a measured value of the capacitance across a minus (−) electrode plate 103a of a first cell 101a and a (−) electrode plate 103b of a second cell 101b facing the (−) electrode plate 103a in case the potential across a plus (+) electrode plate 104a of the first cell 101a and a (+) terminal plate 102b of a second cell 101b neighboring to the first cell 101a is caused to fall to a ground potential (for an acceptable article) and a measured value of the capacitance across a minus (−) electrode plate 103a of the first cell 101a and a plus (+) terminal plate 102b of the second cell 101b neighboring to the minus (−) electrode plate 103a of a first cell 101a with a minus (−) electrode plate 103b of the second cell 101b incase the potential across the plus (+) terminal plate 102a of the first cell 101a and a minus (−) electrode plate 103b of the second cell 101b (for a reject).

4 Claims, 9 Drawing Sheets

BATTERY CELL INSPECTING METHOD AND APPARATUS

BACKGROUND OF THE INVENTION

1. Field of the Invention

This invention relates to a method and apparatus for detecting mistaken insertion of each battery cell in the manufacturing process of a battery having plural battery cells, as in the case of a unit battery.

2. Description of the Related Art

There has so far been used a battery having plural battery cells enclosed in its casing, for example, a unit lead-acid storage battery. The battery cell of this type of the battery is made up of plural positive electrode plates, connected to an positive electrode terminal, and plural negative electrode plates, connected to a negative electrode terminal. These positive electrode plates are flat-plate-shaped and supported by the positive electrode terminal in parallel with one another. Similarly, the negative electrode plates are flat-plate-shaped and supported by the negative electrode terminal in parallel with one another. These positive electrode and negative electrode plates are alternately combined parallel to one another to make up a battery cell. That is, in this battery cell, each positive electrode plate is sandwiched on its both sides by the negative electrode plate with a gap in-between. Similarly, each negative electrode plate is sandwiched on its both sides by the positive electrode plate with a gap in-between. In the gap between the positive electrode and negative electrode plates is arranged a separator formed of an insulating material.

Also, in the above battery cell, the number of the negative electrode plates is larger by one than that of the positive electrode plates. In this battery cell, two of the negative electrode plates are positioned on both outer sides of the battery cell. Each positive electrode plate in the battery cell is positioned inwardly of both outermost negative electrode plates.

The respective battery cells are enclosed in the casing and, in this state, are connected in series with one another via connector. That is, the negative electrode terminal of the first battery cell is connected to an positive electrode terminal of the second battery cell, a negative electrode terminal of the second battery cell is connected to an positive electrode terminal of the third battery cell and so forth so that respective negative electrode terminals are sequentially connected to the positive electrode terminals. The positive electrode terminal of the first battery cell and the negative electrode terminal of the last battery cell are connected to a positive electrode and a negative electrode of the entire battery, respectively.

Within the casing is charged an electrolytic solution, such as dilute sulfuric acid. This electrolytic solution is intruded into the space between the respective electrode plates for immersing the electrode plates therein.

In the manufacturing process for this battery, mistaken insertion of each battery cell into the casing poses a problem. This mistaken insertion is such insertion in which one or more of the battery cells is inserted in an inverted direction into the casing. If the electrode terminals of the respective battery cells are interconnected in such case in a usual fashion, the positive electrode plates and the negative electrode plates are interchanged in their positions insofar as the battery cells inserted in the inverted direction are concerned, so that optimum charging/discharging characteristics cannot be produced.

There has so far been proposed a battery cell inspection device for detecting this inverted insertion of the battery cells in the manufacturing process for the aforementioned type battery. In this battery cell inspection device, a low-frequency ac voltage is applied across one of the electrode terminals of one of the battery cells and the electromotive force across the opposite side battery cell is measured and compared to a reference magnitude of the electromotive force to check whether or not this battery cell has not be inserted in an inverted position.

In the above-described battery cell inspection device, there is produced only a small difference between a measured value in the correctly inserted battery cell and the incorrectly inserted battery cell to render it difficult to decipher whether the battery cell is inserted in the correct position or in the inverted position. The results of decision in such case tend to be unstable.

Also, if, in this battery cell inspection device, the electrode plate has only a small area, or the number of the battery cells making up a sole battery cell is limited, it becomes more difficult to decipher whether or not the battery cell has or has not been inserted incorrectly to render it impossible to obtain accurate results.

SUMMARY OF THE INVENTION

It is therefore an object of the present invention to provide a battery cell inspection method and apparatus in which there is a larger difference between the measured value when the battery cells are inserted in the normal fashion and that when the battery cells are inserted in the inverted position so that decisions on whether or not the battery cell is inserted in the incorrect position can be given easily to assure accurate results of decision.

The present invention provides a battery cell inspection method and apparatus of the present invention, used in a battery manufacturing process for a battery having enclosed therein a plurality of battery cells, each of the battery cells including a plurality of first electrode plates connected to one of the electrode terminals and at least one second electrode plate connected to the other electrode terminal, in which the first and second electrode terminals are parallel to and facing each other. The first electrode plates are positioned outside of the battery cell in each battery cell, with the second electrode plate being positioned inwardly of the first electrode plates on both sides.

In the battery cell inspection method and apparatus of the present invention, a difference between the capacitance in a first state and the capacitance in a second state is detected to detect the fact of mistaken insertion of a given battery cell into the casing. The capacitance in the first state is measured across a first electrode plate of the given battery cell and a first electrode plate of an other battery cell facing the first electrode plate of the given battery cell as a potential of a second electrode plate of the given battery cell and a second electrode plate of the other battery cell neighboring to the given battery cell is caused to fall to the ground potential via each of the electrode terminals. The capacitance in the second state is measured across the first electrode plate of the first battery cell of the given battery cell and the second electrode plate of the other battery cell facing the first electrode plate with the interposition of the second electrode plate of the given battery cell and the first electrode plate of the other battery cell facing the given electrode plate, both of the second electrode plate of the given battery cell and the first electrode plate of the other battery cell being caused to fall in potential to the ground potential, via the respective electrode terminals.

In the battery cell inspection method and apparatus of the present invention, the operation of detecting the difference between the capacitance in a first state and the capacitance in a second state to detect the fact of mistaken insertion of the given battery cell into the casing being sequentially performed every two neighboring battery cells. The battery cell inserted erroneously is identified on detection of the battery cell.

In the battery cell detection method and device according to the present invention, measurement is made of the difference between the capacitance in a first state and the capacitance in a second state to detect the fact of mistaken insertion of a given battery cell into the casing. The capacitance in the first state is measured across a first electrode plate of the given battery cell and a first electrode plate of another battery cell facing the first electrode plate of the given battery cell, as the potential of a second electrode plate of the given battery cell and a second electrode plate of the other battery cell neighboring to the given battery cell is caused to fall to the ground potential via each of the electrode terminals, while the capacitance in the second state is measured across the first electrode plate of the first battery cell of the given battery cell and the second electrode plate of the other battery cell facing the first electrode plate, with the interposition of the second electrode plate of the given battery cell and the first electrode plate of the other battery cell facing the given electrode plate, both of the second electrode plate of the given battery cell and the first electrode plate of the other battery cell being caused to fall to the ground potential, via the respective electrode terminals.

That is, according to the present invention, the difference in the measured values in case of normal battery cell insertion and that incase of mistaken battery cell insertion is large to facilitate decision as to whether or not mistaken insertion occurred to render the result of decision stable. Moreover, if the area of the electrode plate and/or the number of the electrode plates making up a sole battery cell is small, decision as to whether or not mistaken insertion has been made can be given easily to assure correct results of decision.

In the battery cell inspection method and apparatus of the present invention, the operation of detecting, for a battery cell having three or more battery cells enclosed therein, the fact of possible mistaken insertion into the casing of the battery cells, two battery cells at a time, is detected sequentially to identify which battery cell is in a mistaken state of insertion.

DESCRIPTION OF THE PREFERRED EMBODIMENTS

Figure 1:
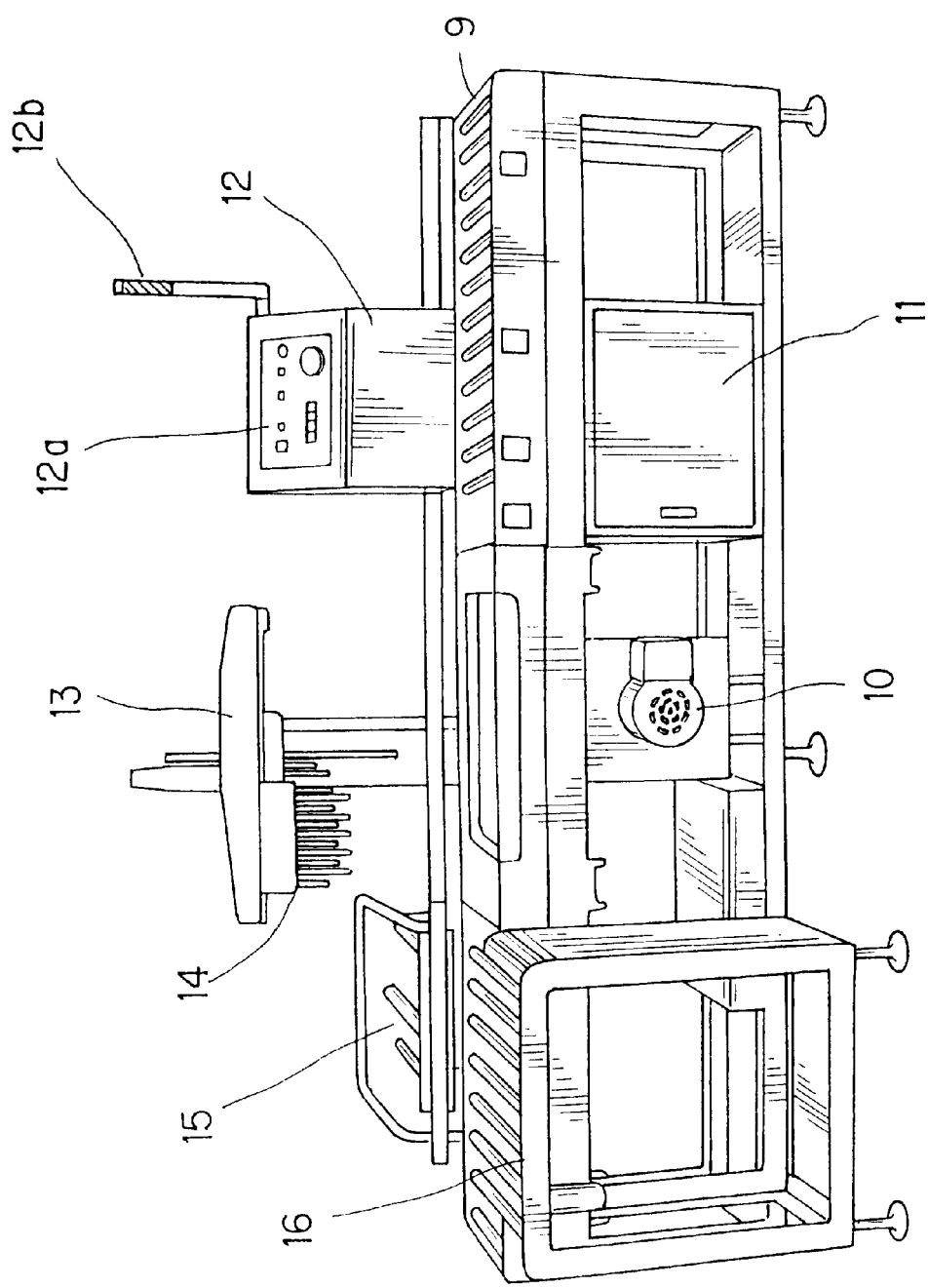
FIG. 1 is a front view showing the structure of a battery cell inspection device for carrying out the battery cell inspection method according to the present invention.

Referring to the drawings, preferred embodiments of the present invention will be explained in detail.

The battery cell inspection method and the battery cell inspection device are used for detecting the possible occurrence of mistaken insertion into a casing of a battery cell in the manufacturing process of a battery, such as a layer-built lead battery comprised of plural battery cells. The battery cell inspection device of the present invention is used for carrying out the battery cell inspection method according to the present invention.

This battery cell inspection device includes a transporting unit 9 for transporting batteries under inspection being manufactured, as shown in FIG. 1. This transporting unit 9 is made up of plural rolls arranged in parallel and on which articles being transported are set and driven by a driving motor 10 for being transported horizontally.

On top of the transporting unit 9 is arranged a controller 12 having a control circuit 12 enclosed therein. This controller 12 controls the transporting unit 9 and the driving motor 10. To this controller 12 is connected a display unit 12a mounted on the front panel of the controller 12, as shown in FIG. 1. On front panel of the controller 12 are mounted an operating unit and an alarm tower 12b. The operating unit is used to input a variety of information signals to the controller 12. The alarm tower 12b displays alarm by sound or light based on an alarm signal sent from the controller 12 on accident occurrence.

Figure 2:
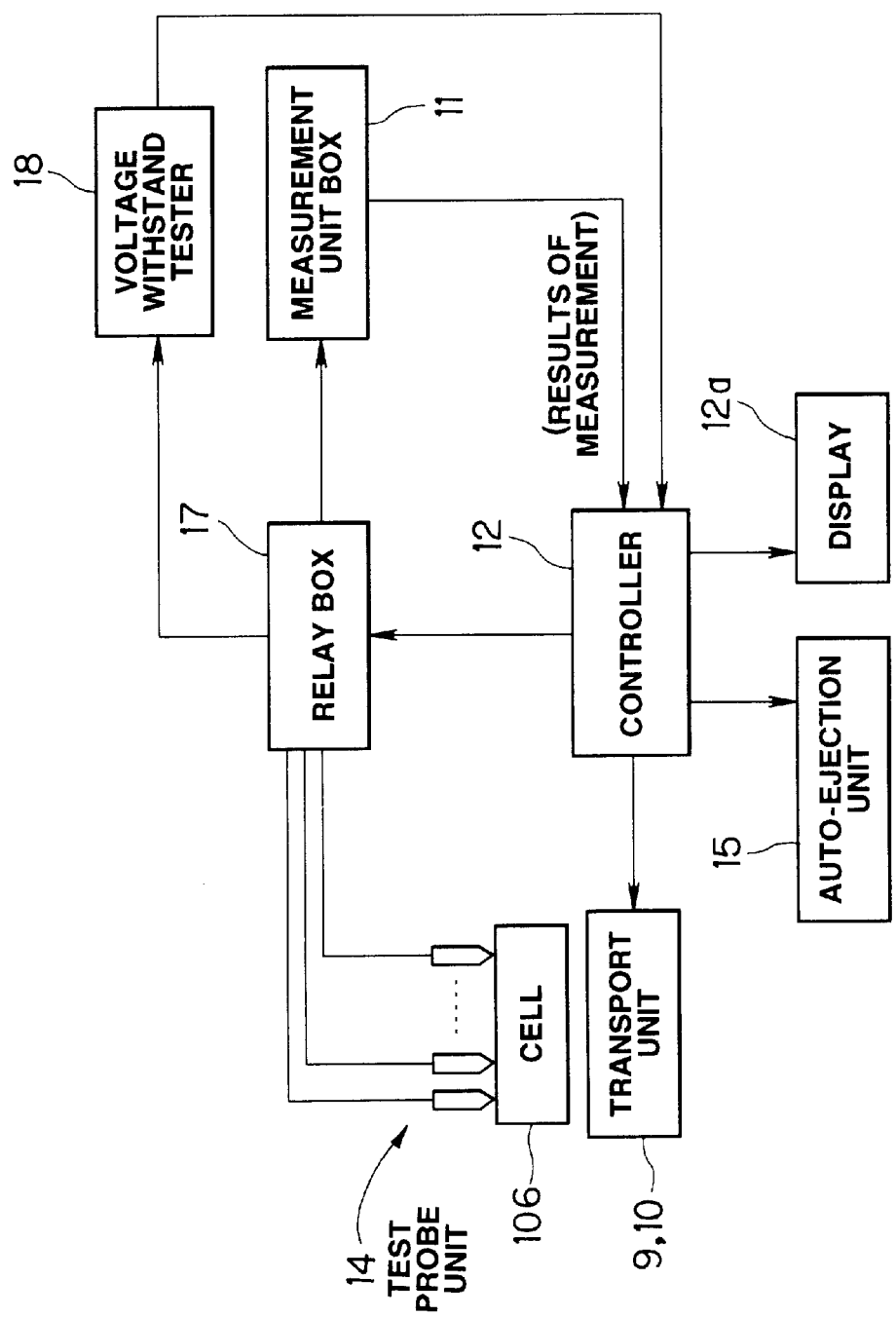
FIG. 2 is a block diagram showing the structure of the battery cell inspection device.
Figure 3:
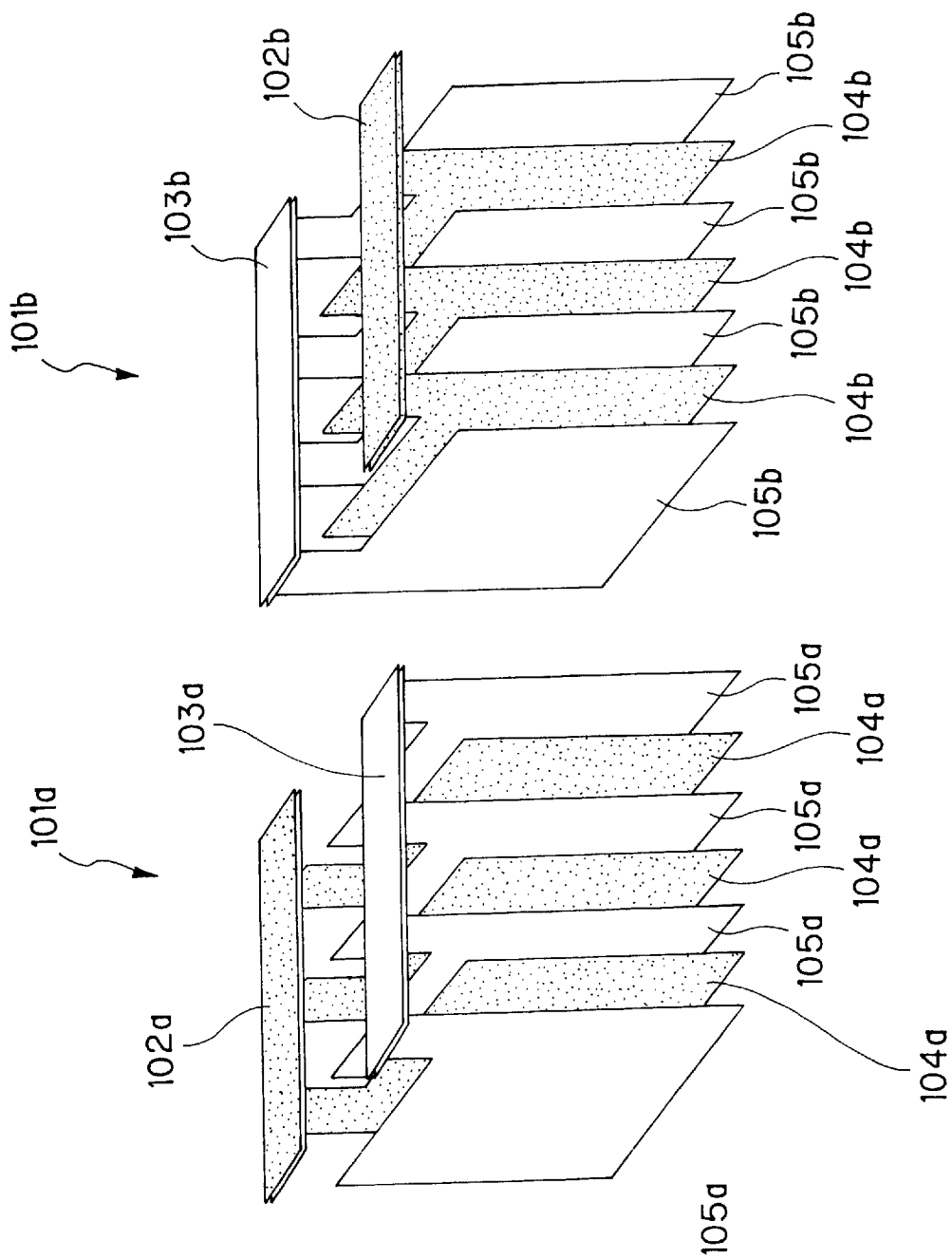
FIG. 3 is a perspective view showing the structure of a battery cell of a battery inspected by the battery cell inspection method and the battery cell inspection device.

To the controller 12 is connected a relay box 17, as shown in FIG. 2. Within this relay box 17 are enclosed plural relays individually controlled by the controller 12. To this relay box 17 is connected a test probe unit 14 including at least first to fourth contact terminals 1 to 4. This test probe unit 14 is contacted at a pre-set point of the battery 106 transported by the transporting unit 9 to enable detection of actual occurrence of the incorrectly inserted battery cell(s) in the battery 106.

To the relay box 17 is connected a measurement box 11 which, having a measurement unit, such as a static capacity measurement unit, enclosed therein, is arranged below the transporting unit 9, as shown in FIG. 1. This test probe unit 14 performs measurements on the battery 106 via the test probe unit 14 and the relay box 17 controlled by the controller 12. The measurement box 11 issues signals indicating the results of measurement to the controller 12.

To the relay box 17 is connected a voltage withstand characteristics tester 18 having a measurement unit for detecting possible shorting of the circuitry in the battery 106. This voltage withstand characteristics tester 18 detects the actual occurrence of the shorting in the battery 106 via the test probe 14 and the relay box 17 controlled by the controller 12. The voltage withstand characteristics tester 18 issues signals indicating the results of measurement to the controller 12.

To this controller 12 is connected an automatic ejection unit 15 which is in operation under control by the controller 12 to extrude the battery found to be a reject by the test probe 14 in the transporting direction by the transporting unit 9, that is in a direction offset from the transporting direction by the transporting unit 9 for accepted articles, for displacing the reject articles onto a reject article table 16.

Each cell of the battery under inspection by the present battery cell detection device includes plural positive electrode plates 104*a*, 104*b*, connected to positive electrode terminals (generally termed positive strap) 102*a*, 102*b*, and plural negative electrode plates 105*a*, 105*b*, connected to negative electrode terminals (generally termed negative strap) 103*a*, 103*b*. The respective positive electrode plates 104*a*, 104*b* are flat-plate-shaped and are supported by the positive electrode terminals 102*a*, 102*b* respectively, in a parallel state to one another. Similarly, the respective negative electrode plates 105*a*, 105*b* are flat-plate-shaped and are supported by the negative electrode terminals 103*a*, 103 *b*, respectively, in a parallel state to one another. These positive electrode plates 104*a*, 104*b* and the negative electrode plates 105*a*, 105*b* are alternately combined to one another in parallel to make up battery cells 101*a*, 101*b*. That is, in the battery cells 101*a*, 101*b*, the positive electrode plates 104*a*, 104*b* are each sandwiched on both sides by the negative electrode plates 105*a*, 105*b* via a gap in-between. Similarly, the negative electrode plates 105*a*, 105*b* are each sandwiched on both sides by the positive electrode plates 104*a*, 104*b* via a gap in-between. In each of the gaps defined between the positive electrode plates 104*a*, 104*b* and the negative electrode plates 105*a*, 105*b*, there is arranged a separator formed of an insulating material, not shown.

In the battery cells 101*a*, 101*b*, the number of the negative electrode plates 105*a*, 105*b* is larger by one than that of the positive electrode plates 104*a*, 104*b*. In the battery cells 101*a*, 101*b*, two of the negative electrode plates 105*a*, 105*b* negative electrode plates 105*a*, 105*b* are disposed on both outer sides of the battery cells 101*a*, 101*b*. In the battery cells 101*a*, 101*b*, the positive electrode plates 104*a*, 104*b* are disposed inwardly of the negative electrode plates 105*a*, 105*b* arranged on the outermost sides.

Figure 4:
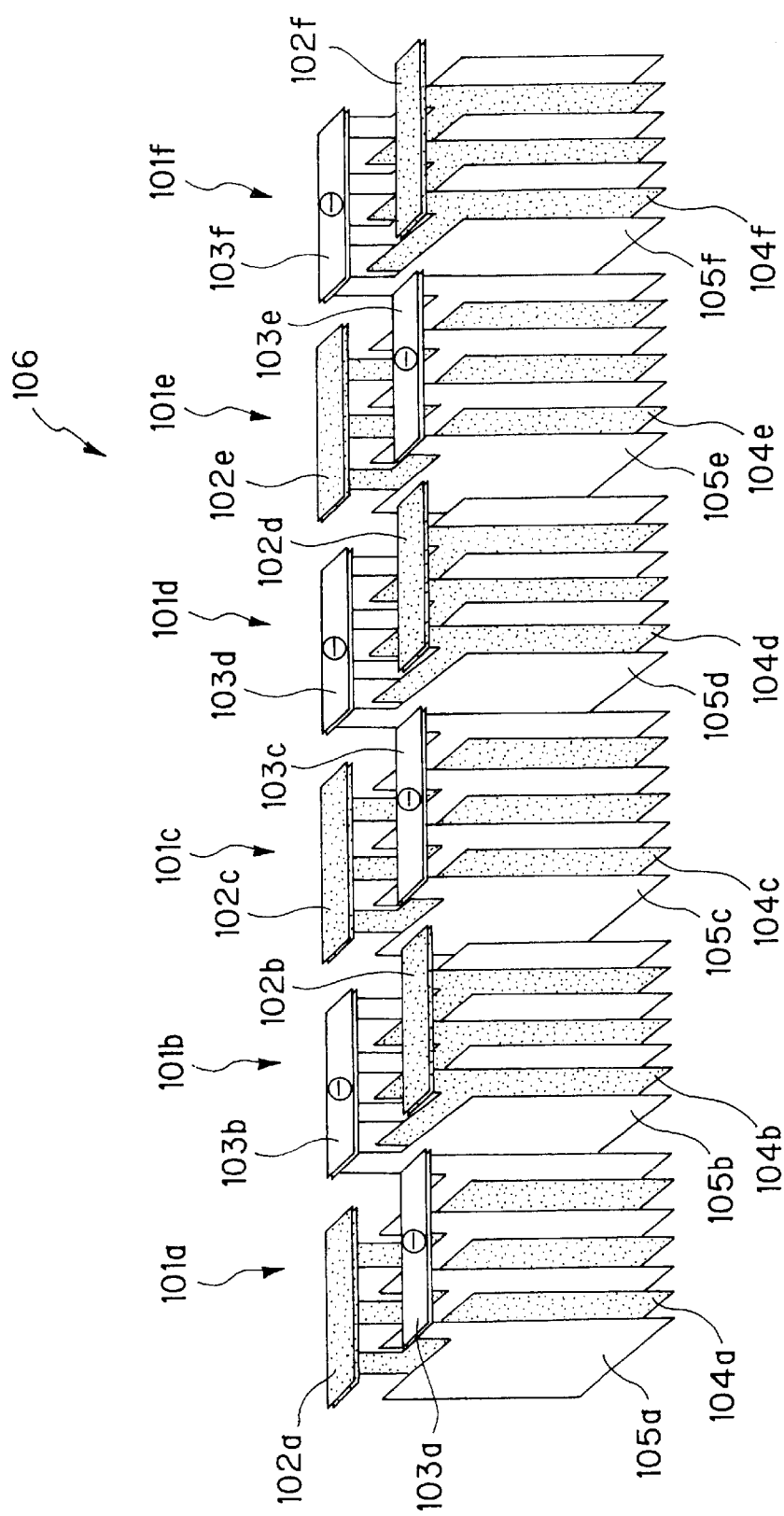
FIG. 4 is a perspective view showing a first arraying state of the battery cell in the battery.

Referring to FIG. 4, plural battery cells, such as first to sixth battery cells 101*a*, 101*b*, 101*c*, 101*d*, 101*e*, 101*f*, as shown for example in FIG. 4, are enclosed in a row in a casing, not shown. These battery cells 101*a*, 101*b*, . . . 101*f* are connected in tandem to one another via electrode terminals 102*a*, 103*a*, 102*b*, 103*b*, 102*c*, 103*c*, 102*d*, 103*d*, 102*e*, 103*e*, 102*f*, 103*f* to constitute a battery cell 106.

Specifically, the negative electrode terminal 103*a* of the first battery cell 101*a* is connected by welding to the positive electrode terminal 102*b* of the second battery cell 101*b*, the negative electrode terminal 103*b* of which is connected by welding to the positive electrode terminal 102*c* of the third battery cell 101*c*, and so forth until the negative electrode terminals are sequentially connected by welding to the positive electrode terminals. The positive electrode terminal 102*a* of the first battery cell 101*a* and the negative electrode terminal 103*f* of the sixth battery cell 101*f* as the last battery cell serve as the positive electrode and the negative electrode of the entire battery, respectively. In the respective battery cells 101*a*, 101*b*, . . . 101*f*, the respective electrode plates 104*a*, 105*a*, 104*b*, 105*b*, . . . 105*f* are parallel to one another. For assuring facilitated interconnection between the 102*a*, 103*a*, 102*b*, 103*b*, . . . 102*f*, 103*f*, the respective battery cells 101*a*, 101*b*, . . . 101*f* are enclosed in the casing so that the positive electrode terminals and the negative electrode terminals are arrayed alternately in the casing. That is, in a given cell and another battery cell neighboring thereto, the relative disposition of the positive electrode and negative electrode terminals is reversed from each other.

In the casing is charged an electrolytic solution, such as dilute sulfuric acid. This electrolytic solution is intruded into the gap between the respective electrode plates so that the respective electrode plates are immersed in the solution.

Figure 5:
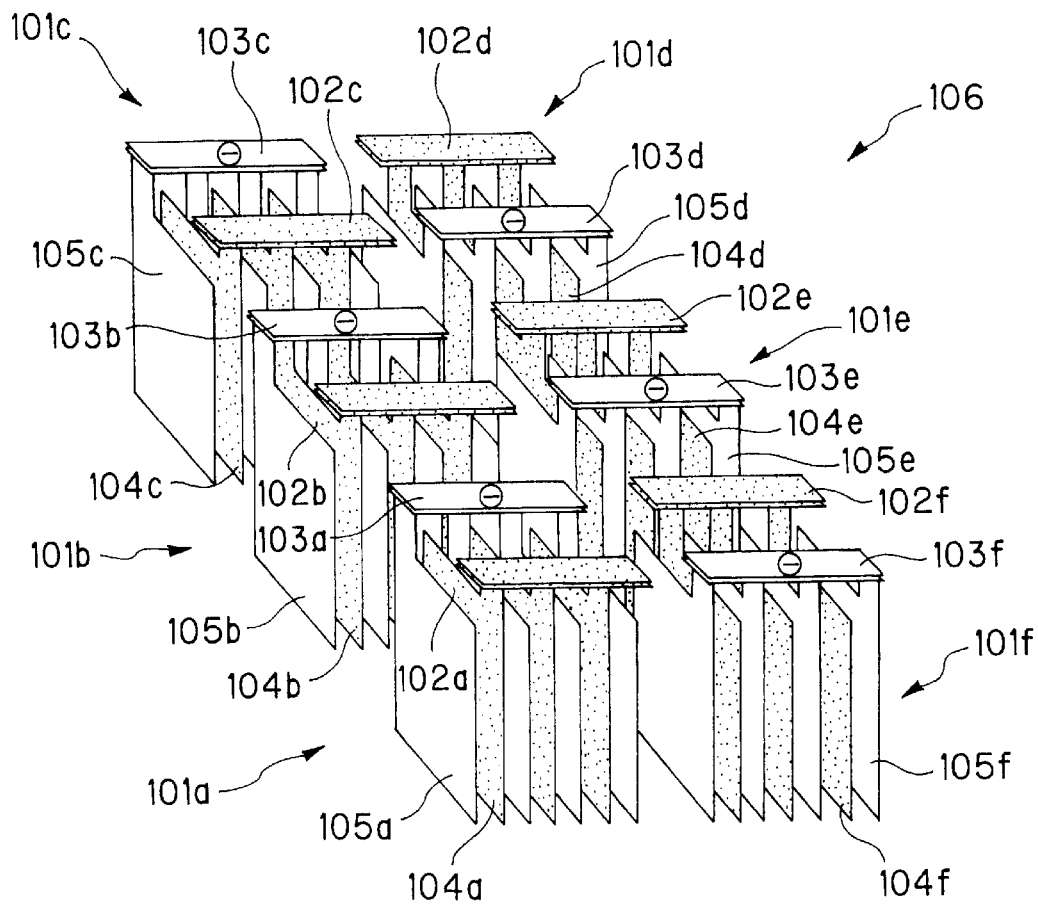
FIG. 5 is a perspective view showing the second arraying state of the battery cells in the battery.
Figure 6:
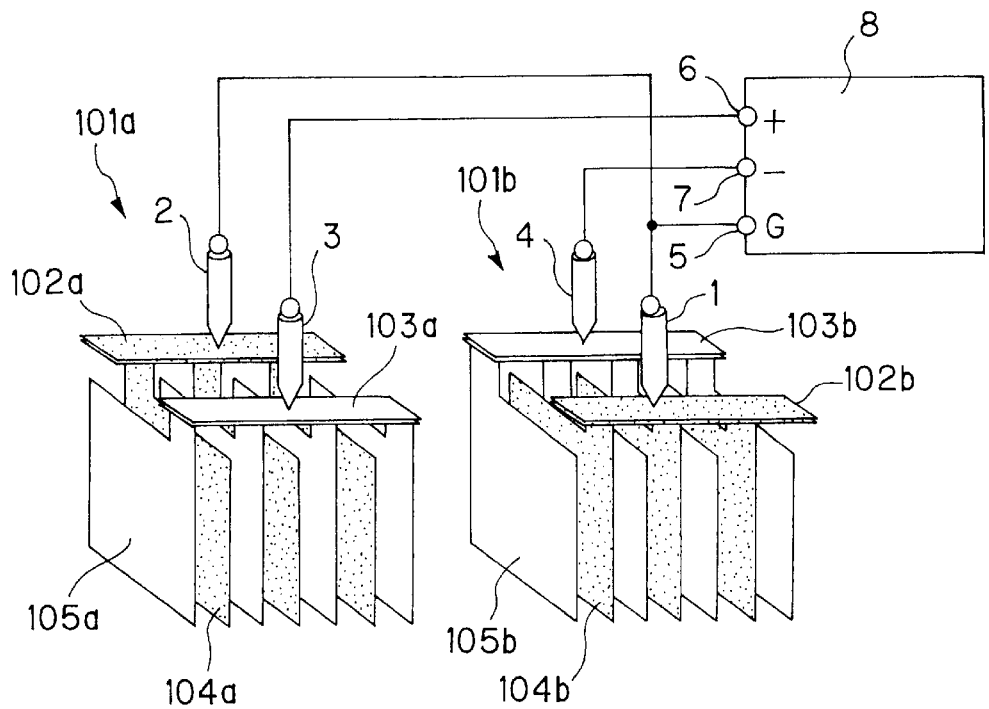
FIG. 6 is a perspective view showing the state of carrying out the inspection of the battery cell of an accepted battery by the battery cell inspection device.
Figure 7:
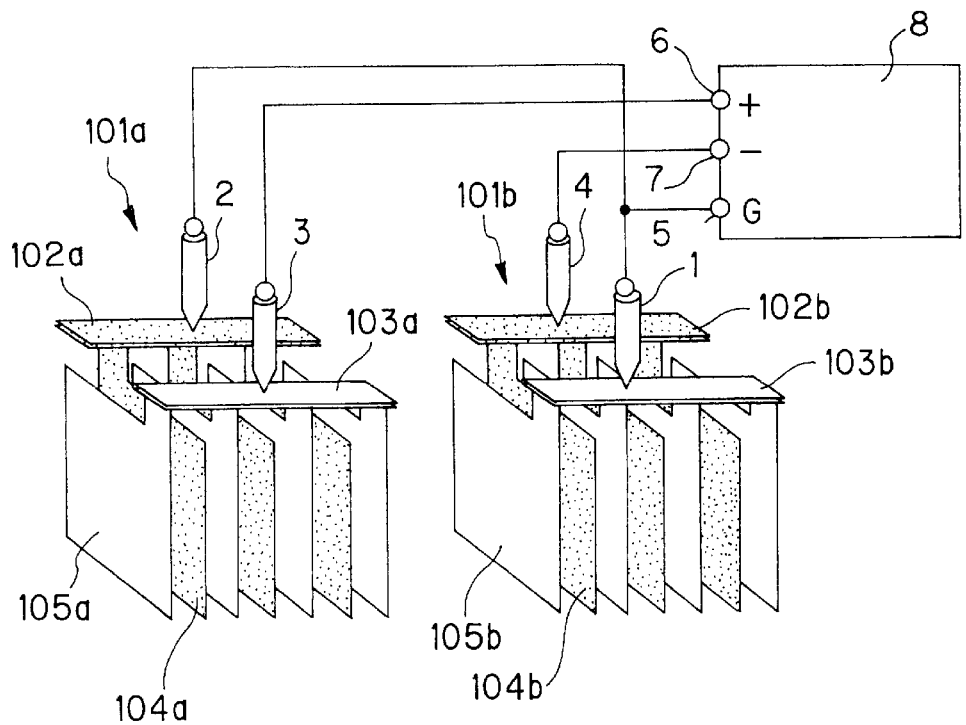
FIG. 7 is a perspective view showing the state of carrying out the inspection of the battery cell in a rejected battery by the battery cell inspection device.

Referring to FIG. 5, the battery 106 may also be constituted by the first to sixth battery cells 101*a*, 101*b*, 101*c*, 101*d*, 101*e* and 101*f*, arranged in an array of two rows by three columns in a casing, not shown, these battery cells 101*a*, 101*b*, . . . 101*f* being interconnected in series with one another by electrode terminals 102*a*, 103*a*, 102*b*, 103*b*, . . . , 102*f*, 103*f*. The negative electrode terminal 103*a* of the first battery cell 101*a* is connected by welding to the positive electrode terminal 102*b* of the second electrode cell 101*b*, the negative electrode terminal 103*b* of which is connected by welding to the positive electrode terminal 102*c* of the third electrode cell 101*c*. In like manner, the negative electrode terminals are connected by welding to the positive electrode terminals. The positive electrode terminal 102*a* of the first battery cell 101*a* and the negative electrode terminal 103*f* of the sixth battery cell 101*f* operate as the positive electrode and the negative electrode of the battery in its entirety. At this time, the electrode plates 104*a*, 105*a*, 104*b*, 105*b*, . . . 104*f*, 105*f* of the battery cells 101*a*, 101*b*, . . . 101*f* all run parallel to one another. Into the casing is charged an electrolytic solution, such as dilute sulfuric acid, which is intruded into interstices between the respective electrode plates to keep the latter in the immersed state. After charging of the electrolytic solution, the casing is heretically sealed to complete the battery.

In the manufacturing process for the battery 106, mistaken insertion into the casing of the battery cells 101*a*, 101*b*, . . . 101*f* poses a problem. This mistaken insertion is the insertion of one or more of the battery cells 101*a*, 101*b*, . . . 101*f* in the inverted direction into the casing. If the electrode terminals of the respective battery cells 101*a*, 101*b*, . . . 101*f* are inserted in this state in the usual manner, the positive electrode plates and the negative electrode plates of the battery cells inserted in the mistaken direction are interchanged to render it impossible to realize optimum charging/discharging characteristics.

In the battery cell inspection device and method according to the present invention, it is checked, after inserting the battery cells 101*a*, 101*b*, . . . 101*f* into the casing and after connection of the electrode terminals 102*a*, 103*a*, 102*b*, 103*b*, . . . 102*f*, 103*f*, if each of the battery cells 101*a*, 101*b*, . . . 101*f* has not been inserted in a mistaken manner into the casing.

In inspecting the fact of possible mistaken insertion, first to fourth contact terminals 1 to 4 of the test probe unit 14 are contacted with the positive electrode terminal 102*b* of the second battery cell 101*b*, positive electrode terminal 102*a* of the first battery cell 101*b*, negative electrode terminal 103*a* of the first battery cell 101*a* and with the negative electrode terminal 103*b* of the second battery cell 101*b*. Of the first to fourth contact terminals 1 to 4 of the test probe unit 14, the first and fourth contact terminals 1, 2 are connected to a grounding terminal G of a static charge measurement unit 8, while the third and fourth contact terminals 3, 4 are connected to its plus (+) and a minus (−) terminals, respectively.

Figure 8:
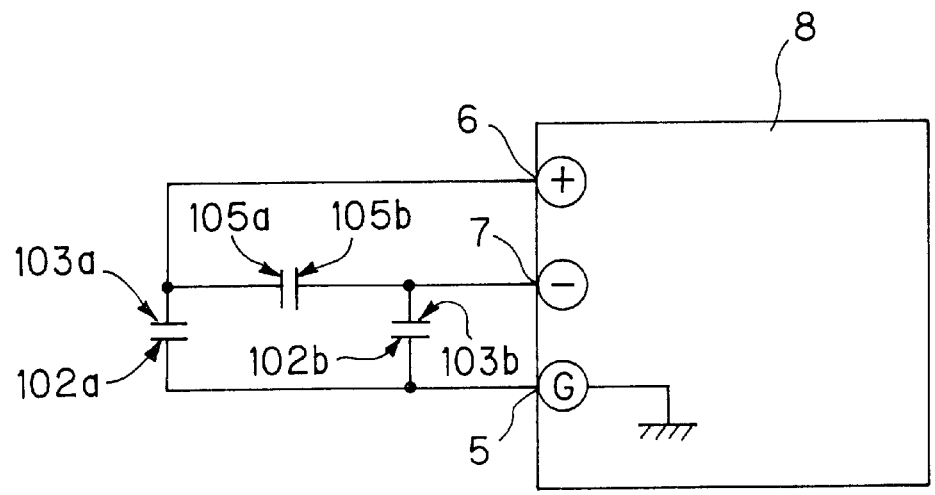
FIG. 8 is a circuit diagram showing the state of carrying out the inspection of the battery cell in an accepted battery by the battery cell inspection device.
Figure 9:
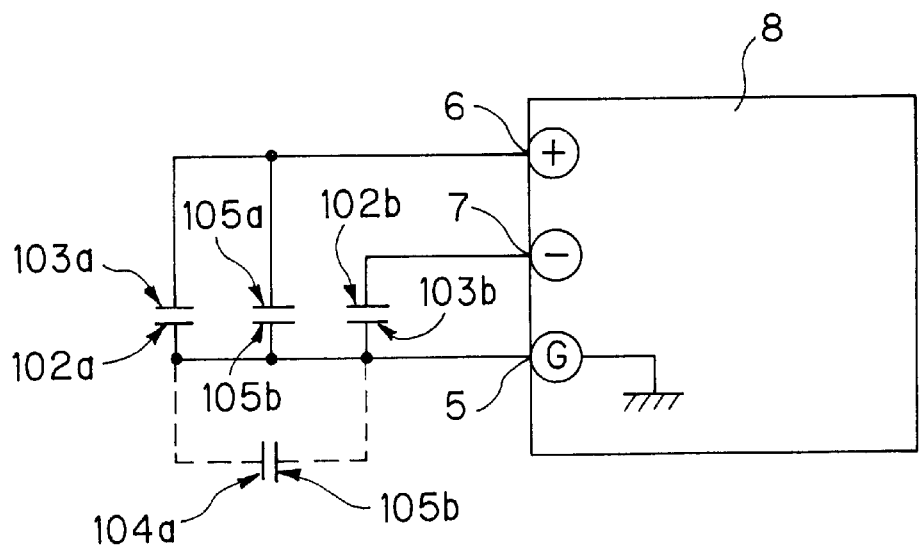
FIG. 9 is a circuit diagram showing the state of carrying out the inspection of the battery cell in a rejected battery by the battery cell inspection device.

Therefore, the positive electrode terminal 102a of the first battery cell 101a and the positive electrode terminal 102b of the second battery cell 101b are connected to the grounding terminal G of the static charge measurement unit 8. The negative electrode terminal 103a of the first battery cell 101a is connected to the plus (+) terminal of the static charge measurement unit 8. The negative electrode terminal 103b of the second battery cell 101b is connected to the (−) terminal of the static charge measurement unit 8. If this state is shown by an equivalent circuit, a capacitor constituted by the negative electrode plate 105a of the first battery cell 110a and the negative electrode plate 105b of the second battery cell 101b is connected across the plus (+) terminal and the (−) terminal of the static charge measurement unit 8, as shown in FIG. 8. This connection state represents the state of connection in the absence of mistaken connection in the respective battery cells 101a, 101b.

If, for example, the second battery cell 101b is in the state of mistaken insertion, the positive electrode terminal 102a of the first battery cell 101a and the negative electrode terminal 103b of the second battery cell 101b are connected to the grounding terminal G of the static charge measurement unit 8, while the negative electrode terminal 103a of the first battery cell 101a is connected to the plus terminal (+) of the static charge measurement unit 8 and the positive electrode terminal 102b of the second battery cell 101b is connected to its minus (−) terminal. If this state is shown by an equivalent circuit, the negative electrode terminal 103a of the first battery cell 101a and the positive electrode terminal 102b of the second battery cell 101b are connected to the plus (+) terminal 6 and to the minus (−) terminal 7 of the static charge measurement unit 8, respectively, insofar as the current path across the plus (+) terminal 6 and to the minus (−) terminal 7 is concerned, so that a capacitor made up of the negative electrode plate 105a of the first battery cell 101a and the positive electrode plate 104b of the second battery cell 101b is connected in circuit. It is noted that the negative electrode plate 105b of the second battery cell 101b connected to the grounding terminal G is interposed between the negative electrode plate 105a and the positive electrode plate 104b.

In this state of mistaken insertion, the static capacitance of the capacitor having the interposed negative electrode plate 105b which has fallen in potential to the ground potential is measured. Thus, as compared to the state free of mistaken insertion, the measured value of the static capacitance exhibits a significant difference. Therefore, the fact of possible mistaken insertion can be reliably comprehended by the relative magnitude of the measured capacitance value.

In the present battery cell inspection device, capacitance values of the respective neighboring battery cells 101a, 101b, . . . 101f can be sequentially measured by moving the first to fourth contact terminals 1 to 4 relative to the battery 106. However, it is also possible to measure capacitance values of the respective neighboring battery cells 101a, 101b, . . . 101f by controlling plural relays in the relay box 17 without moving the test probe unit 14 relative to the battery 106.

Figure 10:
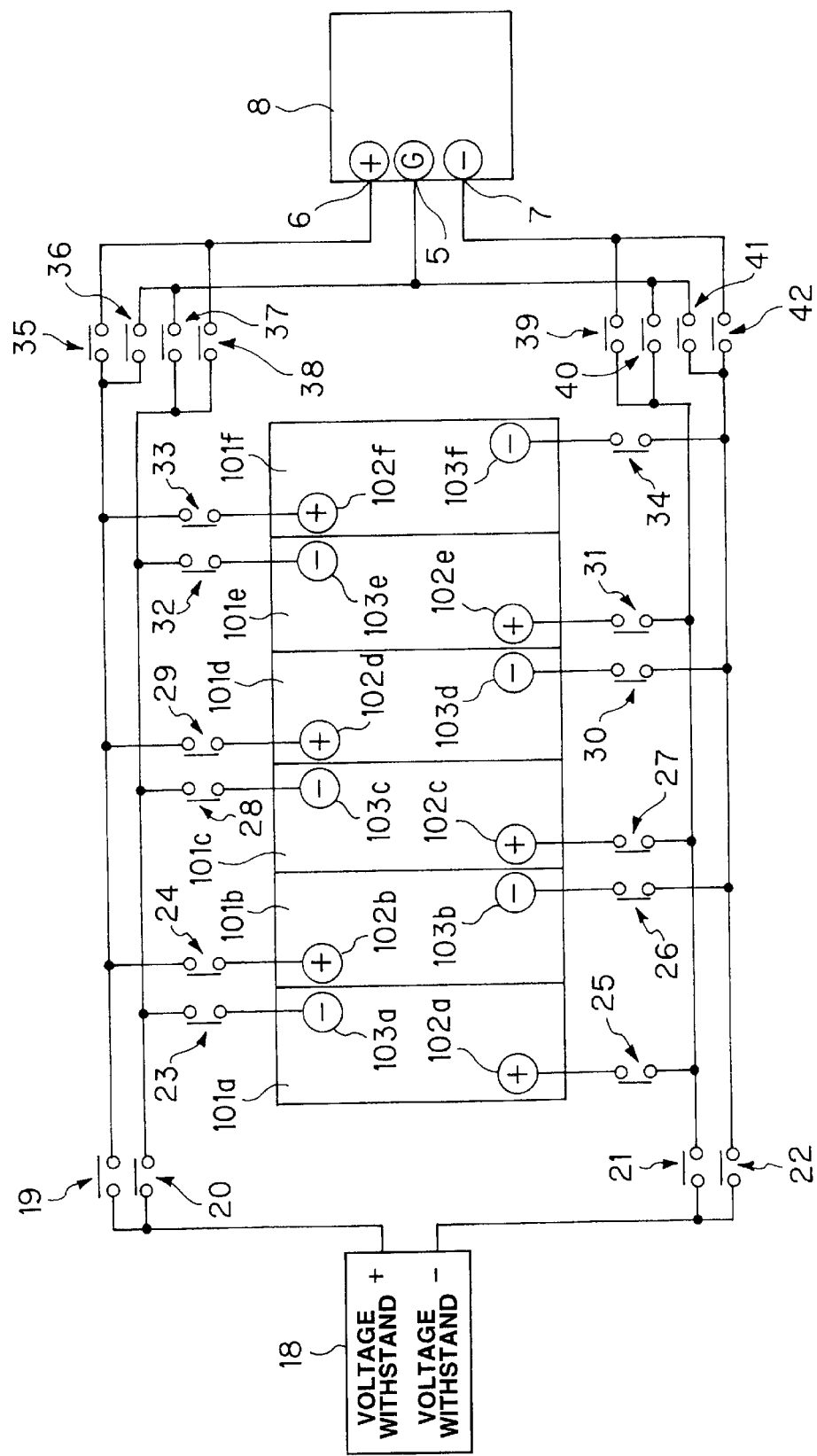
FIG. 10 is a circuit diagram showing the state of carrying out the inspection of a battery having battery cells enclosed therein in a first arraying state.

That is, in the present battery cell inspection device, the first to twelfth contact terminals of the test probe unit 14 are contacted simultaneously with the electrode terminals 102a, 103a, 102b, 103b, . . . 102f, 103f of the first to sixth battery cells 101a, 101b, . . . 101f, as shown in FIG. 10. These contact terminals are connected via respective relays to the grounding terminal G, plus (+) and the minus (−) terminals of the static charge measurement unit 8.

If, in the battery comprised of a row of battery cells, the first battery cell 101a and the second battery cell 101b are to be inspected, relays 25, 40 for connecting the positive electrode terminal 102a of the first battery cell 101a to the grounding terminal G of the static charge measurement unit 8, relays 24, 36 for connecting the positive electrode terminal 102b of the second battery cell 101b to the grounding terminal G of the static charge measurement unit 8, relays 23, 38 for connecting the negative electrode terminal 103a of the first battery cell 101a to the plus (+) terminal of the static charge measurement unit 8, and relays 26, 42 for connecting the negative electrode terminal 103b of the second battery cell 101b to the minus terminal (−) of the static charge measurement unit 8, are closed, with the remaining relayed being opened. Similarly, if the second battery cell 101b and the third battery cell 101c are to be inspected, relays 24, 36 for connecting the positive electrode terminal 102b of the second battery cell 101b to the grounding terminal G of the static charge measurement unit 8, relays 27, 39 for connecting the positive electrode terminal 102c of the third battery cell 101c to the grounding terminal G of the static charge measurement unit 8, relays 26, 42 for connecting the positive electrode terminal 103b of the second battery cell 101b to the minus terminal (−) of the static charge measurement unit 8, and relays 28, 38 for connecting the negative electrode terminal 103c of the third battery cell 101c to the plus terminal (+) of the static charge measurement unit 8, are closed, with the remaining relayed being opened.

For sequentially inspecting the fifth battery cell 101e and the sixth battery cell 101f in a similar manner, relays 31, 40 for connecting the positive electrode terminal 102e of the fifth battery cell 101e to the ground terminal G of the static charge measurement unit 8, relays 33, 36 for connecting the positive electrode terminal 102f of the sixth battery cell 101f to the grounding terminal G of the static charge measurement unit 8, relays 32, 38 for connecting the negative electrode terminal 103e of the fifth battery cell 101e to the plus (+) terminal of the static charge measurement unit 8 and relays 34, 42 for connecting the negative electrode terminal 103f of the sixth battery cell 101f to the minus (−) terminal of the static charge measurement unit 8 are closed, with the remaining relayed being opened.

Figure 11:
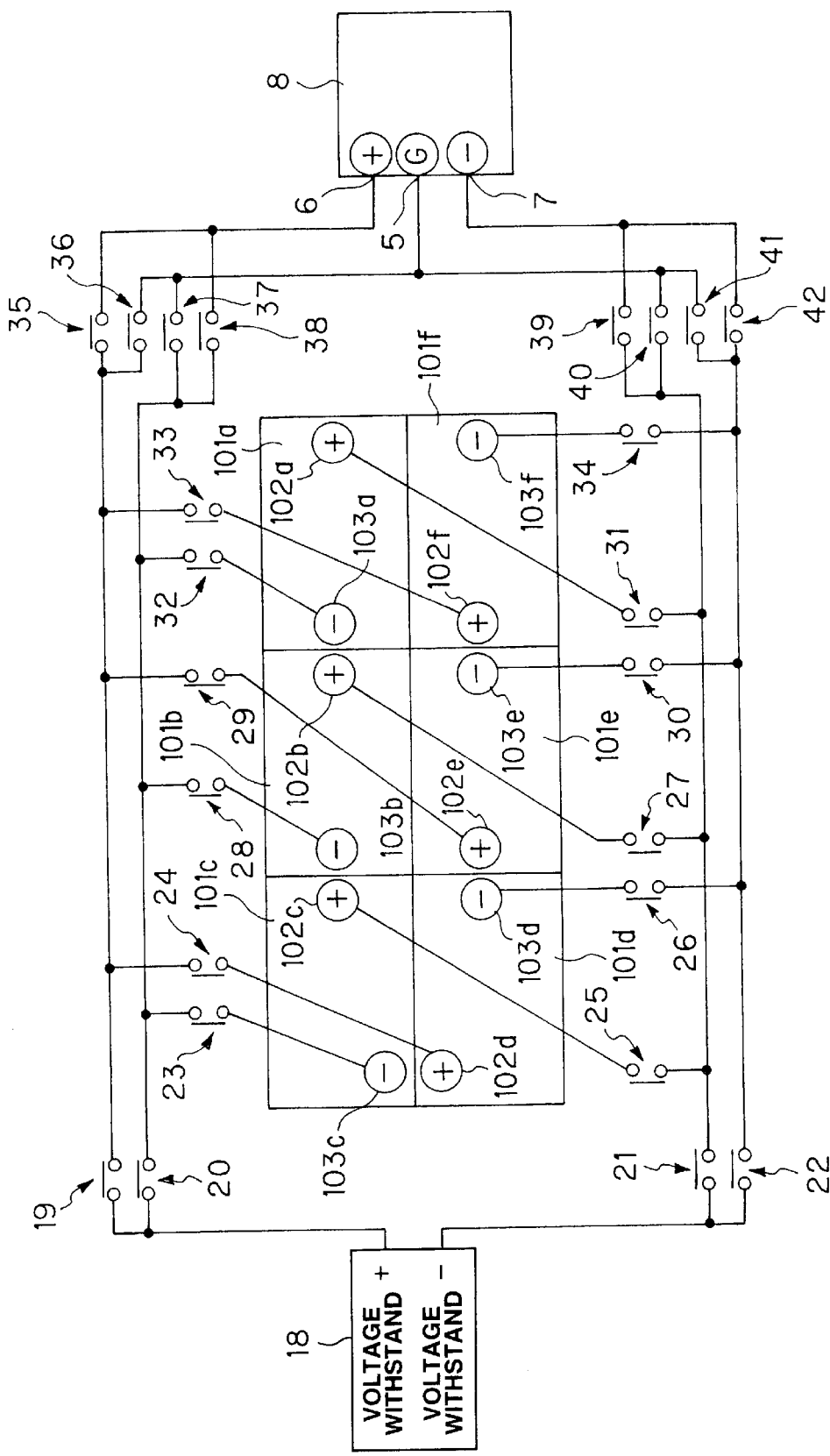
FIG. 11 is a circuit diagram showing the state of carrying out the inspection of a battery having battery cells enclosed therein in a second arraying state.

If, in a battery having the battery cells arrayed in three columns, as shown in FIG. 11, the first battery cell 101a and the sixth battery cell 101f, neighboring to each other, are to be inspected, relays 31, 40 for connecting the positive electrode terminal 102a of the first battery cell 101a to the grounding terminal G of the static charge measurement unit 8, relays 33, 36 for connecting the positive electrode terminal 102f of the sixth battery cell 101f to the grounding terminal G of the static charge measurement unit 8, relays 32, 38 for connecting the negative electrode terminal 103a of the first battery cell 101a to the plus (+) terminal of the static charge measurement unit 8 and relays 34,42 for connecting the negative electrode terminal 103f of the sixth battery cell 101f to the minus (−) terminal of the static charge measurement unit 8 are closed, with the remaining relayed being opened.

If the second battery cell 101b and the fifth battery cell 101e, neighboring to each other, are to be inspected, relays 27, 40 for connecting the positive electrode terminal 102b of the second battery cell 101b to the grounding terminal G of the static charge measurement unit 8, relays 29, 36 for connecting the positive electrode terminal 102e of the fifth battery cell 101e to the grounding terminal G of the static charge measurement unit 8, relays 28, 38 for connecting the negative electrode terminal 103b of the second battery cell 101b to the plus (+) terminal of the static charge measurement unit 8 and relays 30, 42 for connecting the negative electrode terminal 103e of the fifth battery cell 101e to the plus (+) terminal of the static charge measurement unit 8 are closed, with the remaining relayed being opened.

If the third battery cell 101c and the fourth battery cell 101d, neighboring to each other, are to be inspected, relays 25, 40 for connecting the positive electrode terminal 102c of the third battery cell 101c to the grounding terminal G of the static charge measurement unit 8, relays 24, 36 for connecting the positive electrode terminal 102d of the fourth battery cell 101d to the grounding terminal of the static charge measurement unit 8 and relays 26, 42 for connecting the negative electrode terminal 103d of the fourth battery cell 101d to the minus (−) terminal of the static charge measurement unit 8 are closed, with the remaining relayed being opened.

In the present battery cell inspection device, a voltage withstand test can also be conducted by controlling the relay box 17 by the controller 12. This voltage withstand test applies a high electrical voltage across the respective electrode plates to check whether or not shorting has occurred across these electrode plates. Although the actual occurrence of the shorting can be known from the inspection of the actual occurrence of the mistaken insertion, as described above, the voltage withstand test is easier and more reliable if only the fact of actual occurrence of the shorting is to be checked reliably.

In conducting the voltage withstand test, relays 19, 20, 23, 24, 28, 29, 32 and 33 for interconnecting the (+) terminal of the voltage withstand tester 18 and the respective electrode terminals of the battery cells 101a, 101b, . . . 101f and relays 21, 22, 25, 26, 27, 30, 31 and 34 interconnecting the (−) terminal of the voltage withstand tester 18 and the respective electrode terminals of the battery cells 101a, 101b, . . . 101f are closed, with the remaining relayed being opened.

Also, in the present battery cell inspection device, the battery cell inserted erroneously can be identified by sequentially checking the fact of possible mistaken insertion for each of the respective neighboring battery cells in the batteries the battery cells of which have been arrayed in a column. That is, if only one battery cell is inserted erroneously, and the erroneously inserted battery cell is the first battery cell 101a, inspection of the first battery cell 101a and the second battery cell 101b gives the result that mistaken insertion has occurred, whilst inspection of the third battery cell 101b and the fourth battery cell 101d gives the result that no mistaken insertion has occurred.

Similarly, if the battery cell in the mistaken state of insertion is the second battery cell 101b, inspection of the first battery cell 101a and the second battery cell 101b gives the result that mistaken insertion has occurred, whilst inspection of the third battery cell 101b and the fourth battery cell 101d gives the result that no mistaken insertion has occurred and inspection of the third battery cell 101b and the fourth battery cell 101d gives the result that no mistaken insertion has occurred.

Similarly, if the battery cell in the mistaken state of insertion is the second battery cell 101b, inspection of the first battery cell 101a and the second battery cell 101b gives the result that mistaken insertion has occurred, and inspection of the second battery cell 101b and the third battery cell 101c gives the result that mistaken insertion has occurred, while inspection of the third battery cell 101b and the fourth battery cell 101d gives the result that mistaken insertion has occurred.

Likewise, if the erroneously inserted battery cell is the third battery cell 101c, inspection of the first battery cell 101a and the second battery cell 101b gives the result that no mistaken insertion has occurred, and inspection of the second battery cell 101b and the third battery cell 101c gives the result that mistaken insertion has occurred, while inspection of the third battery cell 101b and the fourth battery cell 101d gives the result that mistaken insertion has occurred and inspection of the fourth battery cell 101d and the fifth battery cell 101e gives the result that no mistaken insertion has occurred.

If the erroneously inserted battery cell is the fourth battery cell 101d, inspection of the second battery cell 101b and the third battery cell 101c gives the result that no mistaken insertion has occurred, while inspection of the third battery cell 101c and the fourth battery cell 101d gives the result that mistaken insertion has occurred, while inspection of the fourth battery cell 101d and the fifth battery cell 101e gives the result that mistaken insertion has occurred and inspection of the fifth battery cell 101e and the sixth battery cell 101f gives the result that no mistaken insertion has occurred.

If the erroneously inserted battery cell is the fifth battery cell 101e, inspection of the third battery cell 101c and the fourth battery cell 101d gives the result that no mistaken insertion has occurred, and inspection of the fourth battery cell 101d and the fifth battery cell 101e gives the result that mistaken insertion has occurred, while inspection of the fifth battery cell 101e and the sixth battery cell 101f gives the result that mistaken insertion has occurred.

If the erroneously inserted battery cell is the sixth battery cell 101f, inspection of the fourth battery cell 101d and the fifth battery cell 101e gives the result that no mistaken insertion has occurred, while inspection of the fifth battery cell 101e and the sixth battery cell 101f gives the result that mistaken insertion has occurred.

If more than one battery cell has been inserted erroneously, the above procedure is insufficient to lead to definitive identification of all inserted battery cells. However, the above procedure is sufficient to identify the battery cell(s) suspected to be inserted erroneously.

What is claimed is:

1. In a battery manufacturing process for a battery having enclosed therein a plurality of battery cells, each of said battery cells including at least two first electrode plates connected to a first electrode terminal and at least one second electrode plate connected to a second electrode terminal, said first and second electrode plates having opposite charges, being parallel to each other, facing each other, and arranged in an alternating fashion, a battery cell inspecting method for detecting the fact of possible mistaken insertion of said battery cell into said battery, said battery cell inspecting method being characterized in that said at least two first electrode plates are positioned outside of said at least one second electrode plate;

a difference between a capacitance in a first state and a capacitance in a second state is detected to determine the fact of possible mistaken insertion of said battery cell into said battery;

said capacitance in the first state being measured by dropping the potential of the second electrode plate of a first battery cell and the second electrode plate of a second battery cell neighboring to said first battery cell to a ground potential through each electrode terminal and by measuring the capacitance across the first electrode plate of said first battery cell and the first electrode plate of the second battery cell facing said first electrode plate of the first battery cell;

said capacitance in the second state being measured by dropping the potential of the second electrode plate of the first battery cell and the first electrode plate of said second battery cell neighboring to said first battery cell to a ground potential through each electrode terminal and by measuring the capacitance across the first electrode plate of said first battery cell and the second electrode plate of the second battery cell facing said first electrode plate of said first battery cell, wherein the electrode plate having a potential of which has dropped to the ground potential is interposed between the first electrode plate of the first battery cell and the second electrode plate of the second battery cell.

2. In a battery manufacturing process for a battery having enclosed therein a plurality of battery cells, each of said battery cells including at least two first electrode plates connected to a first electrode terminal and at least one second electrode plate connected to a second electrode terminal, said first and second electrode plates having opposite charges, being parallel to each other, facing each other, and arranged in an alternating fashion, a battery cell inspecting device for detecting the fact of possible mistaken insertion of said battery cell into said battery, said battery cell inspecting device being characterized in that said at least two first electrode plates are positioned outside of said at least one second electrode plate;

said battery cell inspecting device including a first contact terminal connected to a first electrode terminal of said first battery cell;

a second contact terminal connected to a second electrode terminal of said first battery cell;

a third contact terminal connected to a first electrode terminal of a second battery cell neighboring to said first battery cell;

a fourth contact terminal connected to a second electrode terminal of said second battery cell; and capacitance measurement means for dropping the potential of two of said first to fourth contact terminals to a ground potential and for measuring the capacitance across the remaining two contact terminals;

wherein a difference between a capacitance in a first state and a capacitance in a second state is detected to determine the fact of possible mistaken insertion of said battery cell into said battery;

said capacitance in the first state being measured by dropping the potential of the second electrode plate of said first battery cell and the second electrode plate of said second battery cell to a ground potential and by measuring the capacitance across the first electrode plate of said first battery cell and the first electrode plate of the second battery cell facing said first electrode plate;

said capacitance in the second state being measured by dropping the potential of the second electrode plate of the first battery cell and the first electrode plate of said second battery cell to a ground potential and by measuring the capacitance across the first electrode plate of said first battery cell and the second electrode plate of the second battery cell facing said first electrode plate of said first battery cell, wherein the electrode plate having a potential of which has dropped to the ground potential is interposed between the first electrode plate of the first battery cell and the second electrode plate of the second battery cell.

3. In a battery manufacturing process for a battery having enclosed therein three or more of battery cells, each of said battery cells including at least two first electrode plates connected to a first electrode terminal and at least one second electrode plate connected to a second electrode terminal, said first and second electrode plates having opposite charges, being parallel to each other, facing each other, and arranged in an alternating fashion, a battery cell inspecting method for detecting the fact of possible mistaken insertion of said battery cell into said battery, said battery cell inspecting method being characterized in that said at least two first electrode plates are positioned outside of said at least one second electrode plate;

a difference between a capacitance in a first state and a capacitance in a second state is detected to determine the fact of possible mistaken insertion of said battery cell into said battery;

said capacitance in the first state being measured by dropping the potential of the second electrode plate of said first battery cell and the second electrode plate of said second battery cell neighboring to said first battery cell to a ground potential through each electrode terminal and by measuring the capacitance across the first electrode plate of said first battery cell and the first electrode plate of the second battery cell facing said first electrode plate;

said capacitance in the second state being measured by dropping the potential of the second electrode plate of the first battery cell and the first electrode plate of said second battery cell neighboring to said first battery cell to a ground potential through each electrode terminal and by measuring the capacitance across the first electrode plate of said first battery cell and the second electrode plate of the second battery cell facing said first electrode plate of said first battery cell, wherein the electrode plate having a potential of which has dropped to the ground potential is interposed between the first electrode plate of the first battery cell and the second electrode plate of the second battery cell;

said detection of the fact of possible mistaken insertion of said battery cell into said battery by capacitance discrimination detection being sequentially carried out from one set of two neighboring battery cells to another; and wherein if the mistaken insertion of said battery cell is detected, the battery cell which has been mistakenly inserted is identified.

4. In a battery manufacturing process for a battery having enclosed therein three or more of battery cells, each of said battery cells including at least two first electrode plates connected to a first electrode terminal and at least one second electrode plate connected to a second electrode terminal, said first and second electrode plates having opposite charges, being parallel to each other, facing each other, and arranged in an alternating fashion, a battery cell inspecting device for detecting the fact of possible mistaken insertion of said battery cell into said battery, said battery cell inspecting device being characterized in that said at least two first electrode plates are positioned outside of said at least one second electrode plate;

said battery cell inspecting device including a first contact terminal connected to a first electrode terminal of said first battery cell;

a second contact terminal connected to a second electrode terminal of said first battery cell;

a third contact terminal connected to a first electrode terminal of a second battery cell neighboring to said first battery cell;

a fourth contact terminal connected to a second electrode terminal of said second battery cell; and capacitance measurement means for dropping the potential of two of said first to fourth contact terminals to a ground potential and for measuring the capacitance across the remaining two contact terminals;

a difference between the capacitance in a first state and the capacitance in a second state is detected to determine the fact of possible mistaken insertion of said battery cell into said battery;

said capacitance in the first state being measured by dropping the potential of the second electrode plate of said first battery cell and the second electrode plate of said second battery cell neighboring to said first battery cell to a ground potential through each electrode terminal and by measuring the capacitance across the first electrode plate of said first battery cell and the first electrode plate of the second battery cell facing said first electrode plate of the first battery cell;

said capacitance in the second state being measured by dropping the potential of the second electrode plate of the first battery cell and the first electrode plate of said second battery cell neighboring to said first battery cell to a ground potential through each electrode terminal and by measuring the capacitance across the first electrode plate of said first battery cell and the second electrode plate of the second battery cell facing said first electrode plate of said first battery cell, wherein the electrode plate having a potential of which has dropped to the ground potential is interposed between the first electrode plate of the first battery cell and the second electrode plate of the second battery cell;

said detection of the fact of possible mistaken insertion of said battery cell into said battery by capacitance discrimination detection being sequentially carried out from a set of two neighboring battery cells to another; and wherein if the mistaken insertion of said battery cell is detected, the battery cell which has been mistakenly inserted is identified.

* * * * *